July 13, 1943.  L. E. SIMMONS  2,324,033
KERF CUTTING APPARATUS
Filed May 13, 1939  5 Sheets-Sheet 1
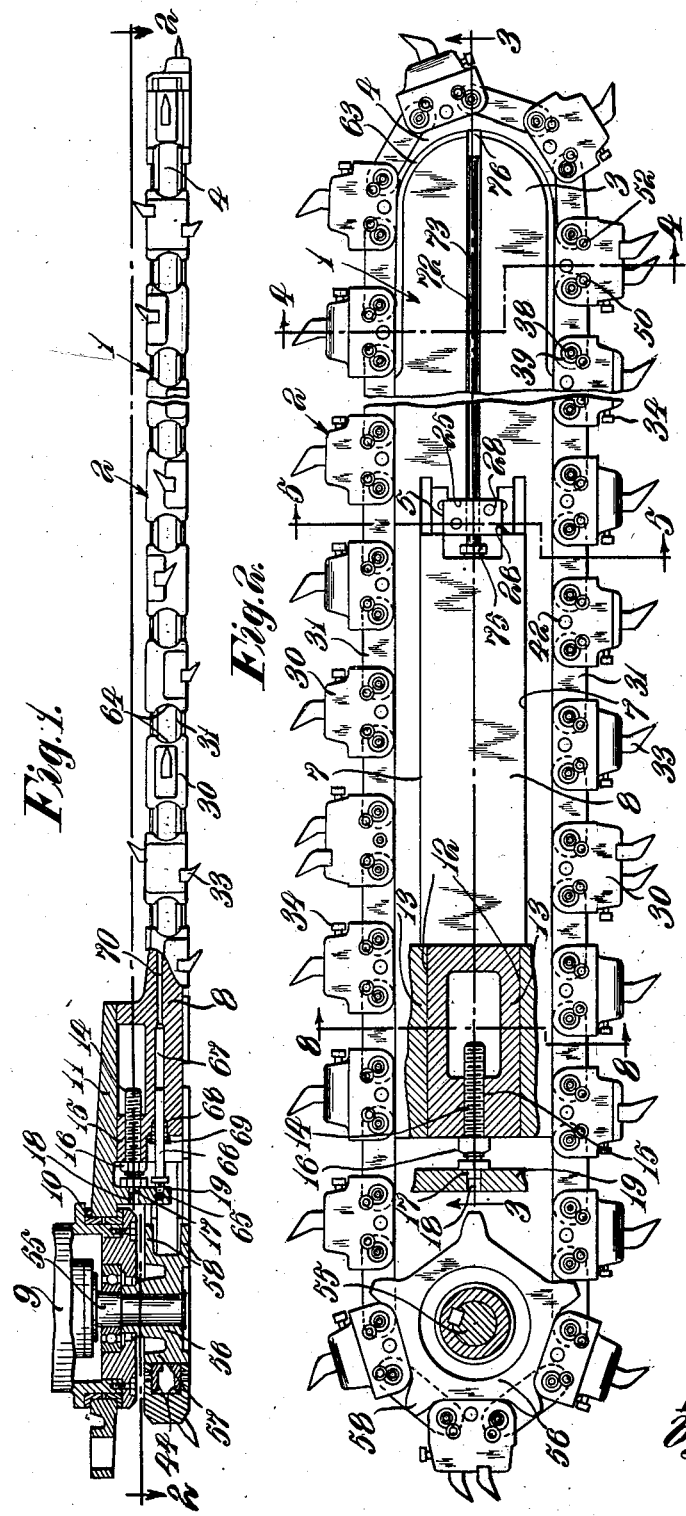
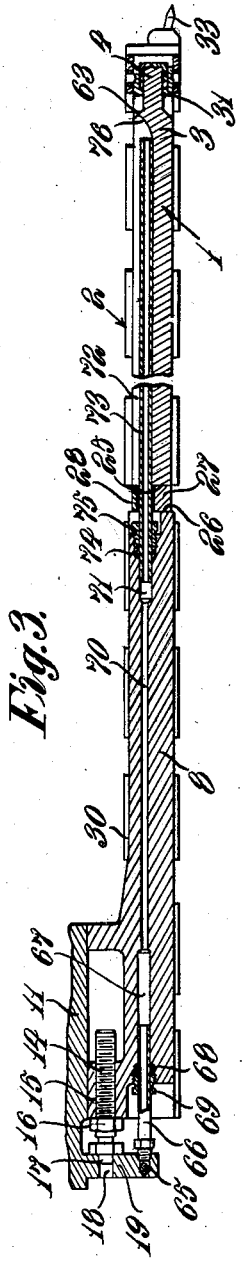
Inventor:
Leon E. Simmons.
by
Atty.

July 13, 1943.  L. E. SIMMONS  2,324,033
KERF CUTTING APPARATUS
Filed May 13, 1939  5 Sheets-Sheet 2
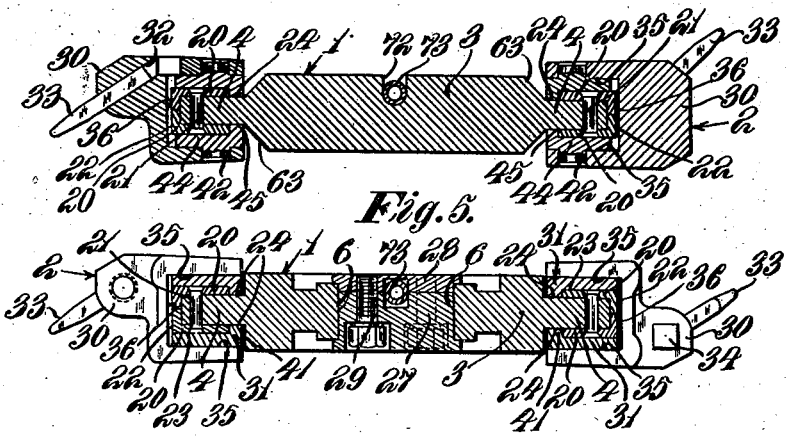
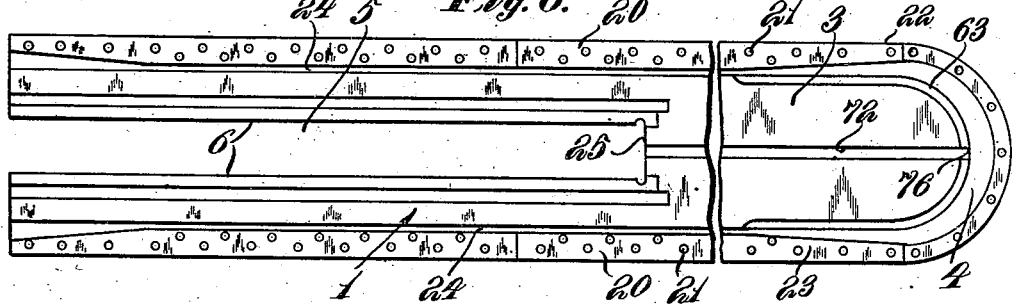
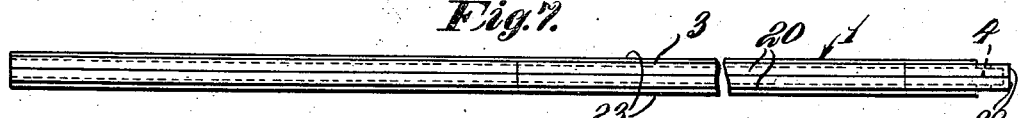
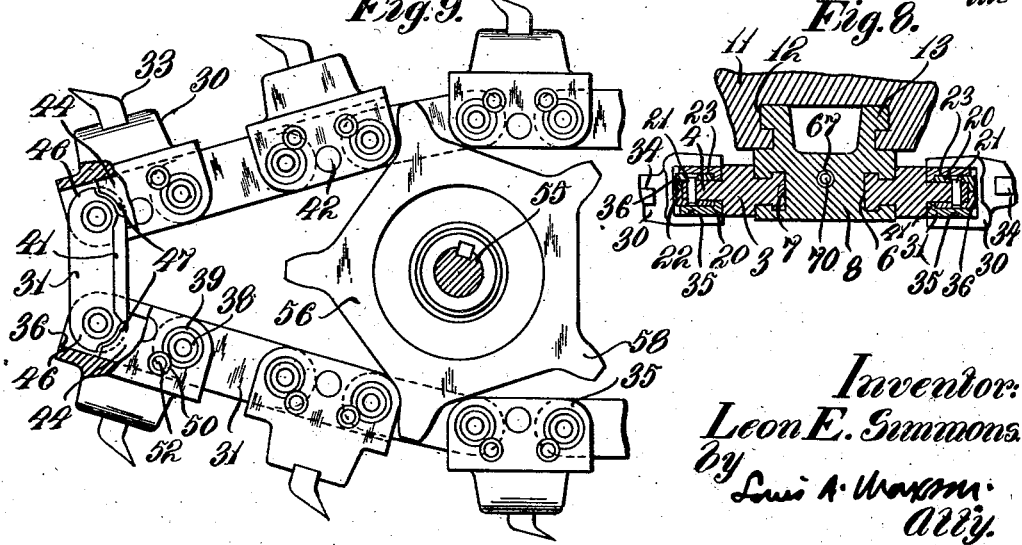
Inventor:
Leon E. Simmons
by
Louis A. Waxman
Atty.

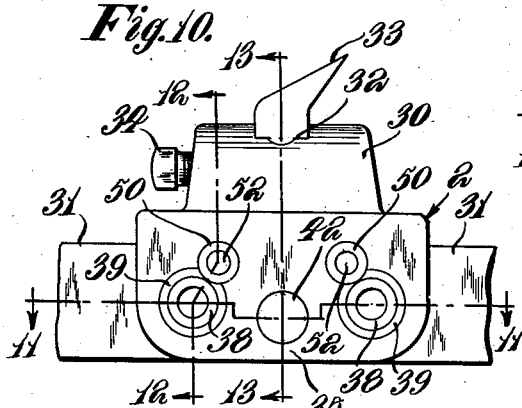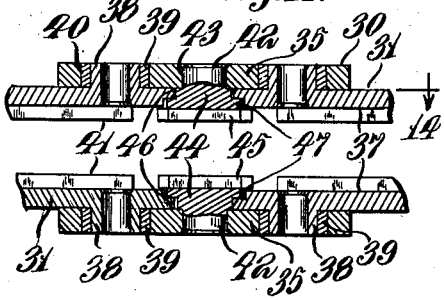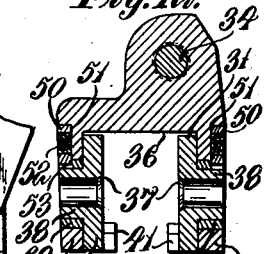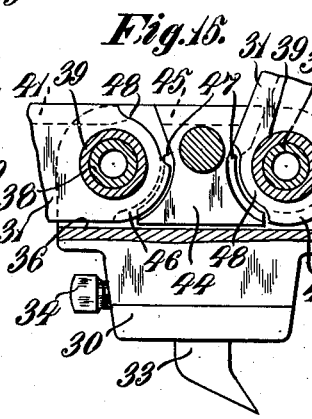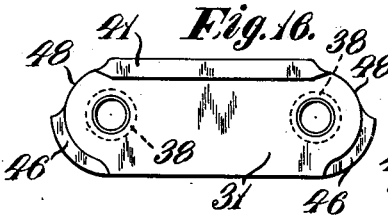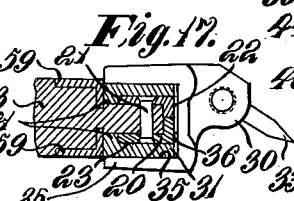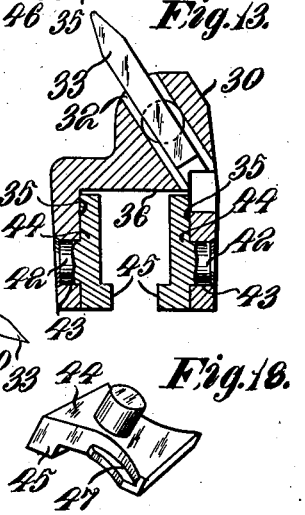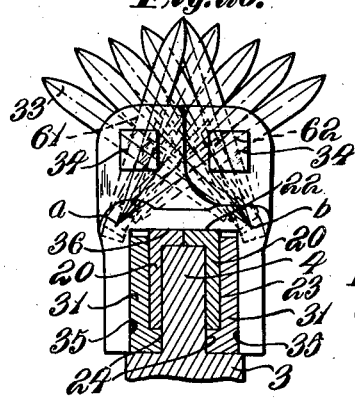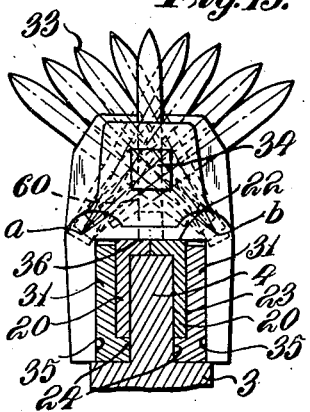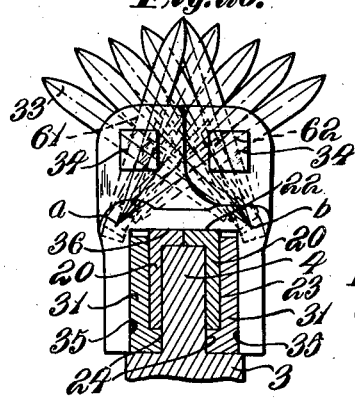

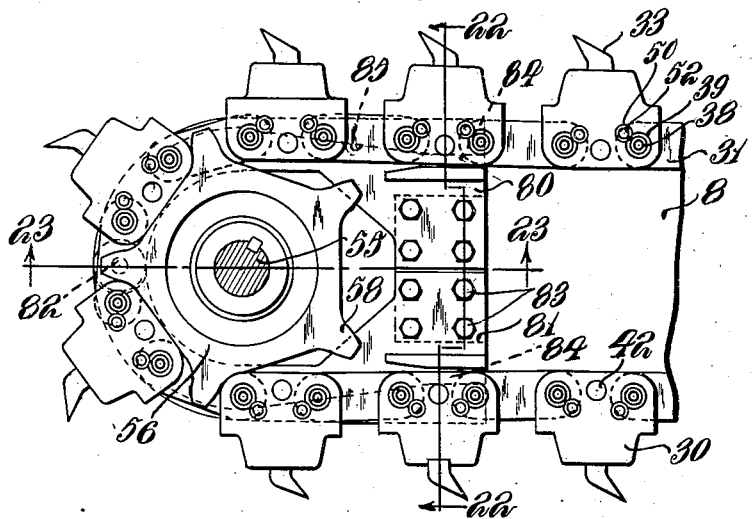
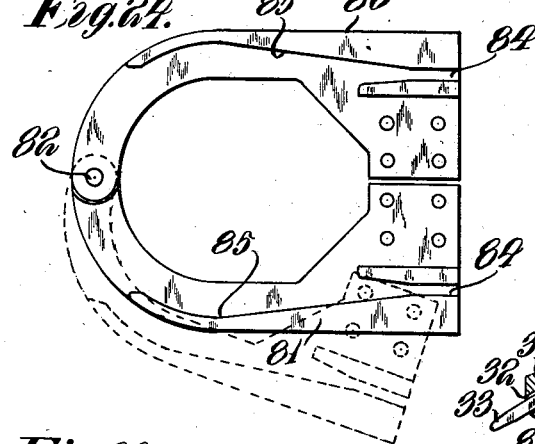
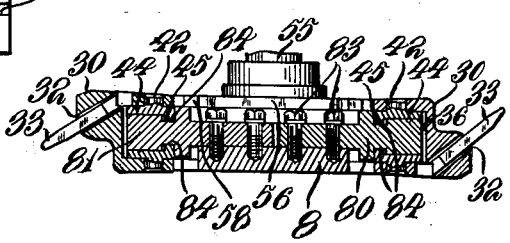

July 13, 1943.   L. E. SIMMONS   2,324,033
KERF CUTTING APPARATUS
Filed May 13, 1939   5 Sheets-Sheet 5
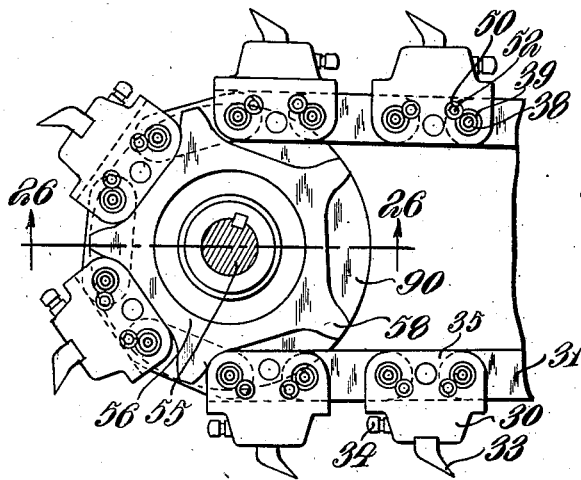
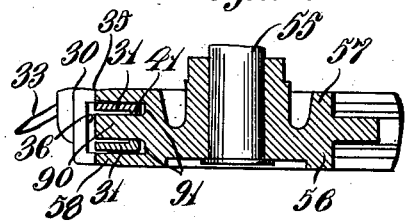
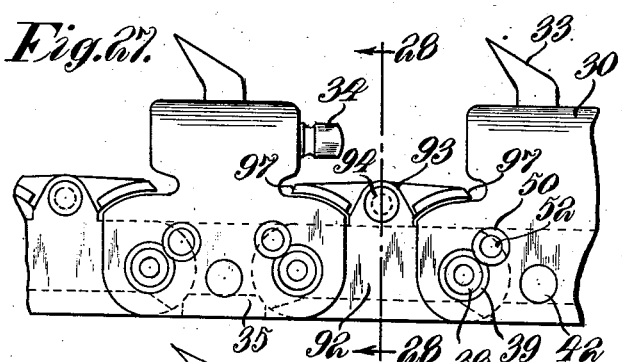
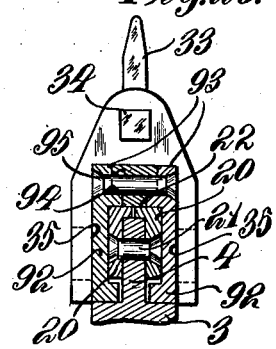
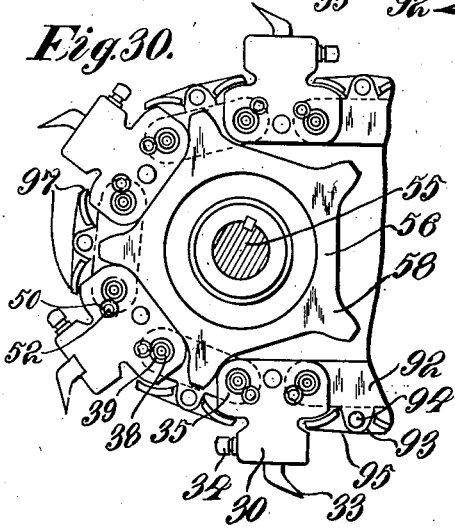
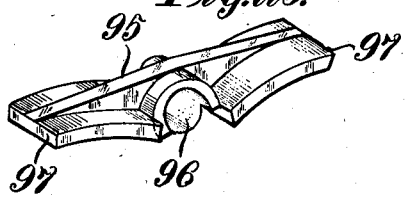
Inventor:
Leon E. Simmons.
by
Louis A. Maxson.
Atty.

Patented July 13, 1943

2,324,033

UNITED STATES PATENT OFFICE 2,324,033

KERF CUTTING APPARATUS

Leon E. Simmons, Claremont, N. H., assignor to Sullivan Machinery Company, a corporation of Massachusetts Application May 13, 1939, Serial No. 273,511

7 Claims. (Cl. 262—33)

This invention relates to cutting apparatus, and more particularly to an improved cutter bar and cutter chain especially designed for coal cutting purposes.

In cutter bars and cutter chains of the present known types, the cutter bars are usually relatively wide or thick in design, providing comparatively little clearance for the bar in the kerf and, as a result, the possibility of binding or sticking of the bar in the kerf is substantially increased, and the power consumption and wear and tear on the bar and its associated cutter chain likewise are materially increased. Furthermore in cutter bars and cutter chains of the usual design, wear often quickly occurs which results in spreading of the top and bottom plates of the bar, thereby decreasing the width of the kerf. Also by the usual bit lacing arrangement and the particular manner of mounting the cutter bits on the chain blocks, substantial leverage due to the relatively great overhang or outward projection of the bits, is present which tends to tilt and bind the cutter chain in the bar guide, greatly decreasing the lives of the bar guide parts and the wearing parts of the chain. Moreover, in present known cutter chains there are provided inadequate wearing surfaces and also, due to the lack of replaceable parts on which wear is concentrated, the cost of repair and replacement is materially increased. Also due to the lack of clearance of the cutter bar in the kerf, substantial tilting or rolling in the kerf while cutting on an uneven bottom or an uneven or pitching seam or roof, is impossible, and as a consequence, sticking or binding of the bar in the kerf often occurs.

An object of this invention is to provide an improved cutter bar and cutter chain especially designed for use in the cutting of coal whereby the disadvantages of the present known cutter bars and cutter chains are, to a substantial extent, overcome. Another object is to provide an improved cutter bar of the so-called "thin" type of an extremely narrow construction particularly adapted to operate in a kerf while providing wide clearance for the bar in the kerf. A further object is to provide an improved cutter bar of a relatively thin and simplified construction having a relatively narrow central body portion presenting a minimum of "dead" area whereby in a given size kerf substantial bar clearance is afforded. A still further object is to provide an improved cutter bar having improved guiding means for the cutter chain guided thereon. Another object is to provide an improved cutter chain having the chain blocks and strap links so constructed and arranged that tendency toward tilting or turning is resisted in an improved manner. A still further object is to provide an improved cutter chain embodying improved means for connecting the blocks and straps whereby worn parts of the chain may be readily replaced while at the same time the blocks and strap links are securely coupled together when in assembled relation on a cutter bar. Another object is to provide an improved cutter bar and cutter chain having an improved gib and wear plate arrangement whereby wear of the chain and bar guide is substantially reduced and which may be readily replaced when worn. Still another object is to provide an improved cutter bar composed of a solid steel plate, resulting in a construction which is not only more simple in design but which is also cheaper to manufacture. A still further object is to provide an improved cutter chain construction whereby the cuttings in the kerf will not accumulate in the chain, there being provided wide clearance spaces whereby the cuttings may flow relatively freely from the chain and bar guide, and also due to the improved chain construction a greater cuttings carrying capacity is attained, reducing the accumulation of cuttings in the kerf. These and other objects and advantages of the invention will, however, hereinafter more fully appear.

In the accompanying drawings there are shown for purposes of illustration several forms which the invention may assume in practice.

In these drawings:

Fig. 1 is a view partially in longitudinal vertical section and partially in side elevation, of the preferred illustrative embodiment of the improved cutter bar and chain.

Fig. 2 is a somewhat enlarged horizontal sectional view, with parts in plan, taken substantially on line 2—2 of Fig. 1.

Fig. 3 is a view in longitudinal vertical section taken substantially on line 3—3 of Fig. 2.

Figs. 4 and 5 are enlarged cross sectional views respectively taken on lines 4—4 and 5—5 of Fig. 2.

Fig. 6 is a plan view of the improved cutter bar, with the bar detached from its hanger frame.

Fig. 7 is a side elevational view of the cutter bar shown in Fig. 6.

Fig. 8 is a fragmentary cross sectional view taken substantially on line 8—8 of Fig. 2.

Fig. 9 is a detail horizontal sectional view, with parts in plan, showing the manner of detaching the cutter chain from the cutter bar.

Fig. 10 is an enlarged elevational view of one of the chain blocks and its associated strap links.

Fig. 11 is a detail sectional view taken substantially on line 11—11 of Fig. 10.

Figs. 12 and 13 are cross sectional views respectively taken on lines 12—12 and 13—13 of Fig. 10;

Fig. 14 is a view partially in section and partially in elevation, taken substantially on line 14—14 of Fig. 11.

Fig. 15 is a view similar to Fig. 14, showing one of the strap links swung into a position to release its locking relation with the chain block.

Fig. 16 is an elevational view of one of the strap links.

Fig. 17 is a fragmentary sectional view, showing a modified form of construction.

Fig. 18 is a perspective view of one of the detachable locking gib members.

Fig. 19 is a detail view showing one form of lacing arrangement for the cutter bits.

Fig. 20 is a detail view showing another form of lacing arrangement for the cutter bits.

Fig. 21 is a fragmentary view similar to Fig. 2, showing another illustrative embodiment of the invention.

Fig. 22 is a cross sectional view taken substantially on line 22—22 of Fig. 21.

Fig. 23 is a view in longitudinal vertical section taken substantially on line 23—23 of Fig. 21.

Fig. 24 is a detail plan view of the supplemental chain guide.

Fig. 25 is a view similar to Fig. 21, showing another illustrative embodiment of the invention.

Fig. 26 is a view in longitudinal vertical section taken substantially on line 26—26 of Fig. 25.

Fig. 27 is an elevational view of a further modified form of cutter chain.

Fig. 28 is a cross sectional view taken substantially on line 28—28 of Fig. 27.

Fig. 29 is a perspective view of one of the chain block shields.

Fig. 30 is a view similar to Fig. 25, illustrating the shield arrangement.

In the illustrative embodiment of the invention shown in Figs. 1 to 20, inclusive, the improved cutter bar is generally designated 1 and the improved cutter chain is generally designated 2. The cutter bar consists of a narrow, elongated solid steel plate 3 of comparatively thin cross section having a curved outer end and formed with a guide flange 4 along its margin, about which the cutter chain is adapted to be circulated. This guide flange is located centrally between the top and bottom plane surfaces of the cutter bar and provides guideways along which the cutter chain is guided, as will later be described. The inner or rearward portion of the cutter bar plate 3 is longitudinally slotted or cut away at 5 along the central portion thereof, and the parallel inner sides 6 of this slot provide guides receivable in longitudinal guideways 7 formed on a bar hanger frame 8. As shown in Fig. 1, a support 9, herein consisting of a part of a coal mining machine, has swiveled thereon at 10 a hanger 11 provided with longitudinal guideways 12 which receive lateral guides 13 integral with the frame 8. Arranged between the hanger 11 and the frame 8 is an adjusting screw 14 threaded within a nut 15 integral with the frame 8 and having an adjusting nut 16. The rear end of the screw has a reduced portion 17 received in an opening 18 in a depending flange 19 formed integral with the hanger 11. By adjusting this screw, the cutter bar may be adjusted in a longitudinal direction along the frame guideways 12 relative to the hanger 11 to vary the tightness of the cutter chain on the cutter bar, in a well known manner. As above mentioned, the guide flange 4 projects from the margin of the cutter bar midway between the top and bottom plane surfaces of the bar, and secured to this guide flange at its opposite sides are wear plates 20, 20 in the form of angle members. These replaceable wear plates, as clearly shown in Figs. 4 and 5, are secured to the guide flange 4, as by rivets 21, and cooperate to provide outer guide surfaces 22 and side guide surfaces 23. Formed between the inner edges of these wear plates and the cutter bar plate body are guideways 24, 24 which receive the cutter chain gibs, in a manner to be later explained. The guideways are relatively narrow and extend in parallel relation along the sides of the bar plate, and as they pass around the curved outer end of the plate they widen out, so to permit the chain gibs to move freely about the curved end of the bar, as the cutter chain is circulated on the bar. It is clearly evident that when these wear plates become worn they can be readily replaced, thereby eliminating the cost of a complete new bar plate.

Interposed between the forward end wall 25 of the slot 5 in the cutter bar and the forward end surface 26 of the hanger frame 8 is a detachable block 27 engaging the side walls 6 of the slot 5 and held in position by a top cap 28 secured to the block by screws 29. This block maintains the cutter bar in a predetermined spaced relation with respect to the hanger frame 8, and by detaching this block the cutter bar may be slid rearwardly relative to the hanger frame 8 to loosen the cutter chain, and as a result reducing the amount of adjustment of the adjusting screw 14 necessary to effect loosening of the chain, thereby to facilitate removal of the chain from the cutter bar as will later be described.

The improved cutter chain 2, as shown most clearly in Figs. 10 to 16, inclusive, comprises a series of chain blocks 30 pivotally connected together by strap links 31. As shown, these chain blocks have sockets 32 for receiving the shanks of usual cutter bits 33. The bit shanks are held in position in the block sockets by usual set screws 34. These bit-receiving sockets are arranged in different angular relations with respect to different chain blocks so that the cutter bits assume different angular positions on the cutter chain and the lacing of the bits is, in this instance, greatly improved. Each chain block has spaced apart parallel side portions or walls 35, and the strap links 31 are arranged between the block side walls, as shown in Fig. 11. The spaced side walls 35, 35 of the chain blocks straddle the guide flange 4 of the cutter bar, and the inner plane surface 36 of each block slidingly engages the outer surfaces 22 of the wear plates, while the inner surfaces 37 of the strap links 31 slidingly engage the side surfaces 23 of the wear plates. The strap links 31 have lateral trunnions 38 projecting outwardly therefrom, and these trunnions are received within bushings 39 fitted within openings 40 in the side walls of the chain blocks, and these straps are formed with inwardly projecting gibs 41. Secured at 42, as by riveting, within openings 43 formed in the block side walls midway between the openings 40 are pin-like portions of replaceable gib members 44, the latter herein arranged at the inner sides of the block side walls between adjacent ends of the strap links and having inwardly projecting gibs 45. These gibs 41, 45 on the strap links and replaceable gib members are adapted to run in the guideways 24 provided at the opposite sides of the bar guide flange 4. When the gibs of the replaceable gib members 44 become worn, they can readily be replaced simply by driving out the rivets, thereby eliminating the cost of replacement of a complete chain block. For holding the strap links in position with respect to the chain blocks, each strap link has at its opposite ends an arcuate locking projection 46 adapted to cooperate with arcuate locking projections 47 on the gib members 44. The strap links are arcuately slotted at 48 so that when the strap links are swung into the position shown at the right in Fig. 15, the locking projections 46 are released from the locking projections 47 and the strap links may then be moved laterally inwardly from their locking relation with the gib members. When the strap links and blocks are in guided relation on the cutter bar they assume the position shown in Fig. 14 and at that time the strap links are locked to the gib members on the chain blocks due to the interlocking relation of the locking projections 46, 47. While the gib members cooperate with the strap links to prevent lateral displacement of the latter, the strap links are free to swing about their pivotal trunnion connections with the chain blocks while the locking relation is maintained, thereby to permit the same to move freely about the margin of the cutter bar. As shown in Figs. 10 and 12, the bushings 39 are held against outward axial release from the openings 49 in the block side walls, preferably by means of washer or ring-like members 50 seated within circular recesses 51 in the sides of the chain blocks and permanently secured to the chain blocks as by welding, as at 52. The inner lower portions of the members 50 project within recesses 53 in the bushings and due to their interlocking relation with the bushings, hold the latter in position within the side wall bores.

Mounted on the support 9 is a vertical drive shaft 55 having keyed thereto and driven thereby a chain sprocket 56 (see Fig. 1). This chain sprocket has a circular central body portion 57 formed at its top and bottom sides with sprocket teeth 58. As shown, the strap links pass around the circular body portion of the sprocket and the sprocket teeth straddle the strap links, in the manner shown, so that the sprocket teeth engage the end surfaces of the chain blocks to effect driving of the cutter chain about the margin of the cutter bar. By this arrangement the chain sprocket has laterally spaced driving contacts with the chain blocks, thereby reducing the tilting tendency of the chain within the bar guides and resulting in a stronger and more durable construction with less wear on the bar guides.

In the modification shown in Fig. 17, there are shown supplemental wear plates 59 in the form of angle members riveted or otherwise secured to the bar plate, and the inner surfaces of the strap links 31 may slidably engage these wear plates, particularly in the event that the guide surfaces at the outer edge of the guide flange 4 become worn.

Now referring to the novel lacing arrangement of the cutter bits on the chain blocks, it will be noted that the cutter bits project angularly about two nucleal lines as indicated at $a$ and $b$ in Figs. 19 and 20. By lacing the cutter bits angularly about these two nucleal lines offset laterally from and parallel with the medial plane of the chain, instead of the conventional practice of grouping the cutter bits about a nucleal line located at the medial plane of the chain, it is found that the cutting action of the bits has been improved and the possibility of loss in kerf width due to dulled bits is substantially reduced, the novel arrangement of the bits reducing the size of the cores and increasing chain clearance. Also by this novel bit arrangement with the nucleal lines located in close adjacency to the outer periphery of the cutter bar and spaced laterally outside the bar guide in the manner shown, the overhang or outward projection of the bits is substantially reduced, thereby reducing the twisting or tilting stresses on the chain and also resulting in the chain being retained in its path of travel on the bar guide in a more rigid manner. Further by crossing the cutter bits in the manner shown and by arranging the outermost bits at a relatively wide angle with respect to the medial plane of the chain, the cutting action is improved since there is less side-edge scraping as distinguished from tip cutting. In other words, there is a frontal attack of all the cutting points of the bits on the coal instead of a side-edge attack, so that the kerf width is substantially maintained even when the bits become dull. In Fig. 19 the chain block has a centrally located socket 60 for receiving one of the cutter bits 33 and supporting the latter in a centrally located position with the cutting point of the bit located in the medial plane of the chain. In Fig. 20 one of the chain blocks has inwardly inclined sockets 61 and 62 spaced longitudinally of the block for receiving a pair of the cutter bits 33 for supporting the latter in rearwardly inclined positions with their cutting points located in the medial plane of the chain. Either or both of these cutter bit arrangements may be employed.

To provide for free flow of the cuttings from the guideways on the cutter bar, thereby to reduce the possibility of binding or sticking of the cutter chain, the cutter bar is inwardly bevelled at 63 at its opposite sides around the outer end of the bar, in the manner shown in Figs. 4 and 6. Further to provide clearance for the cuttings, the opposite ends of the chain blocks 30 are cut away at 64 (Fig. 1). It is accordingly evident that as the cutter chain passes around the outer end of the cutter bar, the cut-away portions 64 on the chain blocks reduce the amount of cuttings carried inwardly within the chain guides of the cutter bar, while the bevelled portions 63 at the outer end of the cutter bar permit free inward flow of the cuttings from the chain guides.

The cutter chain may be readily removed from the cutter bar simply by removing the spacing block 27 upon release of the top cap 28 and adjusting the screw 14 so that the cutter chain is slackened on the cutter bar. The cutter chain may then be pulled rearwardly with respect to the chain sprocket, in the manner shown in Fig. 9, to bring two of the chain blocks and the connecting strap links into the position shown. When the rearmost strap links are in the position shown in Fig. 9, the locking projections 46 are released from the locking projections 47 of the replaceable gib members so that the strap links may be moved inwardly to release their trunnions from the bushings 39. When the strap links are thus disconnected, the chain may be readily withdrawn from the cutter bar guideways.

In this improved construction means is provided for supplying a dust allaying liquid to the cutter chain so as to allay the dust created by the cutter bits during the kerf cutting operation. This dust allaying means, in this instance, comprises a passage 65 formed in the depending flange 19 integral with the hanger 11, and this passage leads to any suitable source of liquid supply. The passage 65 is connected by a conduit 66 with a passage 67 formed in the hanger frame 8. The conduit 66 has telescopic sliding relation with the passage 67, and a packing 68 having an adjusting gland nut 69, sealingly engages the conduit for preventing leakage between the parts. The passage 67 is connected by a longitudinal passage 70 in the hanger frame with a passage 71. Received in the passage 71 and arranged in a longitudinal slot 72 formed in the cutter bar is a conduit 73. A packing 74 having an adjustable gland nut 75, sealingly engages the conduit 73 for preventing leakage between the parts. The slot 72 has an upwardly curved outer end 76 so that the liquid discharged from the outer end of the conduit 73 is directed laterally into the kerf. The telescopic connection 66, 67 maintains the liquid flow irrespective of the adjusted position of the hanger frame 8 with respect to the hanger 11.

In the illustrative embodiment of the invention shown in Figs. 21 to 24, inclusive, means is provided for guiding the cutter chain with respect to the drive sprocket 56 at the inner end of the cutter bar and for directing the chain gibs within the bar guideways. This chain guiding and directing means comprises a pair of identical guide parts 80 and 81 pivotally connected together at 82 at their rear ends, and these guide parts, when swung in position with respect to the chain sprocket, surround the circular body portion of the sprocket between the sprocket teeth, in the manner shown in Figs. 21 and 23, and when in assembled relation are secured to the hanger frame 8 by means of screws 83. The parts 80 and 81 have guideways 84 disposed in registry with the bar guideways and provided with inner guide surfaces 85 for guiding the chain gibs as the chain passes onto and from the drive sprocket. The gibs on the cutter chain move along the guide surfaces 85 until they enter the guideways 84 and then pass from the guideways 84 smoothly into the guideways on the cutter bar.

In the illustrative embodiment shown in Figs. 25 and 26 a modified form of supplemental chain guiding means is provided. In this construction the chain drive sprocket 56 has formed integral with its circular body portion, midway between the sprocket teeth, an annular guide flange 90, there being provided between this flange and the sprocket teeth annular spaces 91 for receiving the strap links of the cutter chain as the latter passes around the sprocket. This annular flange 90 guides the chain as it passes around the sprocket and to some extent serves to direct the chain with respect to the bar guideways.

In the embodiment of the invention shown in Figs. 27 to 30, inclusive, means is provided for shielding the chain blocks 30 so as to reduce access of the cuttings to the bar guideways. As shown, the chain blocks are connected by strap links 92 of a modified construction, the strap links having upstanding lugs 93 provided with alined openings for receiving a cross pin or rivet 94. Pivotally mounted on each of these rivets is a chain block shield or closure member 95 having a centrally located bearing portion 96 and provided with curved end portions 97 cooperating with the adjacent ends of the chain blocks to provide a closure between the blocks. These shields prevent access of the cuttings within the chain between the block ends and as a result reduce the possibility of binding or sticking of the chain due to clogging of cuttings in the bar guideways.

As a result of this invention it will be noted that an improved cutter bar and cutter chain are provided whereby wear of the chain and bar parts and the cost of replacement are substantially reduced. It will also be noted that by forming the bar of a solid steel plate of comparatively thin cross section, unusually wide clearance is provided for the bar in the kerf, thereby facilitating tilting or rolling of the bar without undue binding. It will further be evident that by the provision of the improved cutter bar and chain construction, affording wide clearance spaces, the cuttings may flow relatively freely from the chain and bar guides, and by the improved chain construction a relatively great cuttings-carrying capacity is attained, thereby reducing the accumulation of cuttings in the kerf. Further, by the provision of the drive sprocket arrangement disclosed, the tendency of tilting of the cutter chain is reduced, resulting in a stronger and more durable construction with less wear on the chain and bar guides. It will also be evident that by the provision of the bit lacing arrangement disclosed the outward projection or overhang of the bits from their points of support is considerably reduced and as a result the cutter chain is retained in its path on the bar guides in an improved manner. These and other advantages of the improved cutter chain and cutter bar will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a cutter chain, a series of chain blocks, strap links for pivotally connecting said blocks together, said strap links having inwardly directed gibs, detachable gib members secured to said blocks and arranged between said strap links, said gib members having inwardly directed gibs interposed between said strap link gibs, and an interlocking connection between said strap links and said gib members for preventing lateral release of said strap links with respect to said blocks.

2. In a cutter chain, a series of chain blocks, strap links for pivotally connecting said chain blocks together, said chain blocks having spaced apart parallel side walls and said links projecting between said side walls and having outwardly directed trunnions projecting within openings in said block side walls, and an interlocking connection between said blocks and strap links for retaining said trunnions in said side wall openings.

3. In a cutter chain, a series of chain blocks, strap links pivotally connecting said blocks together, said links having arcuate locking projections at their opposite ends, and members secured to said blocks and arranged between said links, said members having arcuate flanges overlying said link projections for locking said links against lateral release from said blocks.

4. In a cutter chain, a series of chain blocks, strap links pivotally connecting said blocks together, said links having arcuate locking projections at their opposite ends, and members secured to said blocks and arranged between said links, said members having arcuate projections overlying said link projections for locking said links against lateral release from said blocks, said links having arcuate slots and being swingable about their pivotal connections with said blocks to bring said slots into registry with the projections on said members to release said link projections from the projections on said members thereby to permit lateral release of said links from said blocks.

5. A cutter bar mounting comprising a support having longitudinal guideways, a hanger frame mounted on said support guideways and having guideways parallel with said support guideways, a bar member slidably mounted on said frame guideways for adjustment longitudinally with respect to said hanger frame, said bar member having a guideway along its margin for guiding a cutter chain, a detachable block interposed between said frame and bar member for limiting the relative adjustment of said bar member with respect to said frame, and means for adjusting said frame relative to said support guideways.

6. In a cutter chain, a series of chain blocks having spaced apart parallel side portions, strap links for pivotally connecting said chain blocks together, said links projecting between said block side portions and having outwardly directed trunnions projecting within opening in said block side portions, and projections on said block side portions engaging the inner surfaces of said links for retaining said trunnions within said openings.

7. A cutter bar mounting comprising a support having longitudinal guideways, a hanger fame mounted on said support for adjustment on the guideways thereof, said hanger frame having guideways parallel with said support guideways, a bar member slidably mounted on said frame guideways and adapted to guide a cutter chain about its margin, and means for adjusting said frame relative to said support guideways to vary the tension of the cutter chain, said bar member being slidable on said frame guideways to loosen the cutter chain independently of any adjustment of said adjusting means.

LEON E. SIMMONS.

CERTIFICATE OF CORRECTION.

Patent No. 2,324,033.                                July 13, 1943.

LEON E. SIMMONS.

It is hereby certified that error appears in the printed specification of the above numbered patent requiring correction as follows: Page 2, first column, line 7, after "Fig. 10" strike out the semicolon and insert instead a period; page 3, first column, line 66, for "slidably" read --slidingly--; and second column, line 37, for "rearwardly" read --inwardly--; page 5, second column, line 10, claim 6, for "opening" read --openings--; and that the said Letters Patent should be read with this correction therein that the same may conform to the record of the case in the Patent Office.

Signed and sealed this 26th day of October, A. D. 1943.

(Seal)
                                       Henry Van Arsdale,
                            Acting Commissioner of Patents.